United States Patent Office 3,423,587
Patented Jan. 21, 1969

3,423,587
DETERMINATION OF RAINFALL RADIOACTIVITY
Jean Goupil, Saint-Germain-en-Laye, France, assignor to
Commissariat a l'Energie Atomique, Paris, France
Filed Aug. 25, 1965, Ser. No. 482,448
Claims priority, application France, Sept. 1, 1964,
986,802
U.S. Cl. 250—83.3                5 Claims
Int. Cl. H01j *39/00;* G01t *1/16*

ABSTRACT OF THE DISCLOSURE

Apparatus for determining the radioactivity of rainfall includes a collector for the rainfall having an outlet pipe connected to a beta-ray detecting cup. An outflow regulating device is disposed on the downstream side of the cup and is controlled by a pressure pick-up which responds to the level of the water in the collector so that the flow regulating element controls the flow at a value proportional to the level of the water. Measuring means are connected to the beta-ray detecting cup and volume measuring means measure the volume of water passing through the regulating device.

---

This invention relates to a method and apparatus for the determination of the radioactivity of rainfall, and more particularly the continuous and accurate determination of the $\beta$ and $\gamma$ radioactivities thereof.

Hithertofore collecting apparatuses have been generally used which supply the rainwater samples for subsequent checking. To determine the development of radioactivity during rainfall, such an apparatus has been constructed which divides the rainfall collected into a number of fractions. In one particular apparatus of this kind, the rainwater received by a collector is distributed by a series of gutters to a series of flasks, each gutter being connected with a flask, so that when a gutter receives rainwater it supplies the corresponding flask.

This method is not altogether satisfactory, since personnel are required to take the measurements and the sampling system shows only approximately the radioactivity of the rainfall, since its amount may vary between very wide limits.

However, the most important parameters to be determined is the specific total radioactivity of the rainfall, and it is therefore more logical to pass all the rainfall collected through the particular apparatus used for measuring its radioactivity; in which case the flow of rainfall through the apparatus will have to be highly variable.

According to one aspect of the invention there is provided a method of determining the radioactivity of rainfall, comprising the step of continuously collecting rainfall in a reservoir, evacuating the water collected at a rate proportional to the level of the water in the reservoir, and continuously measuring the radioactivity and volume of the water evacuated from the reservoir.

According to a second aspect of the invention there is provided an apparatus for determining the radioactivity of rainfall, said apparatus comprising a buffer reservoir for collecting the rainfall, an outlet pipe having a $\beta$-ray-detecting cup, an outflow regulating element disposed on the outlet pipe downstream of the cup, a pressure pick-up which responds to the level of the water in the reservoir and controls the flow-regulating element to fix the flow at a value proportional to the level of the water, and an element for measuring the volume of water evacuated.

The measurement is performed by a $\beta$ radiation detector, for two main reasons: firstly, the majority of the elements to be detected (strontium, yttrium, etc.) emit $\beta$ rays; and secondly, the samples taken are always small, whereas $\gamma$ ray detection requires a considerable volume to obtain an acceptable signal to noise ratio.

Figure 1:
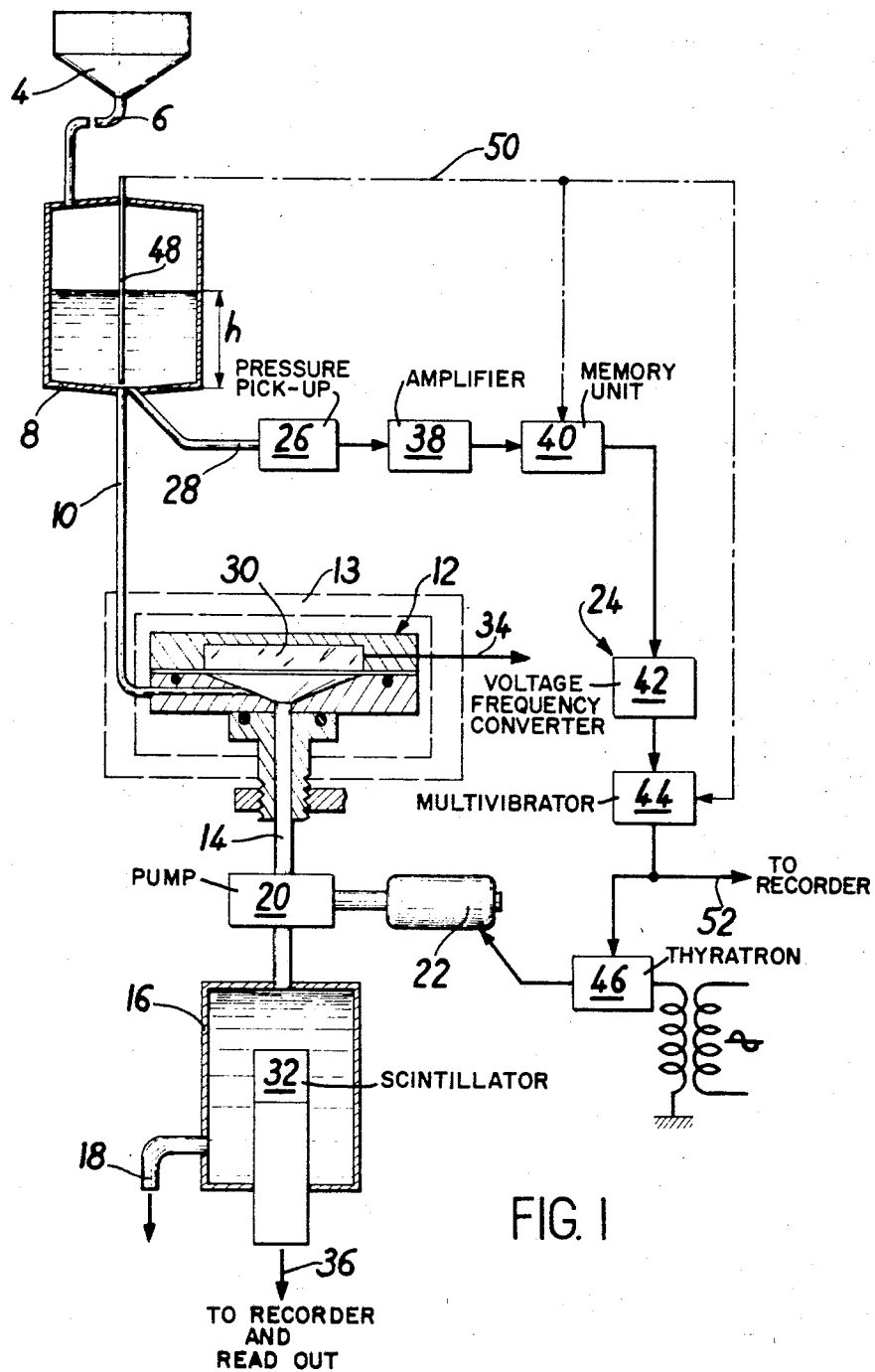
Figure 2A:
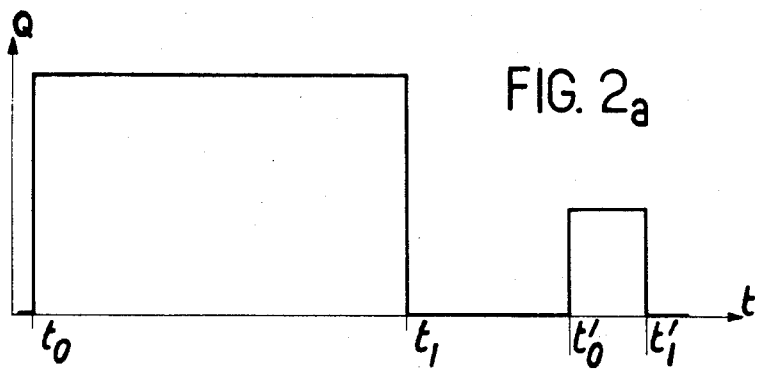
Figure 2B:
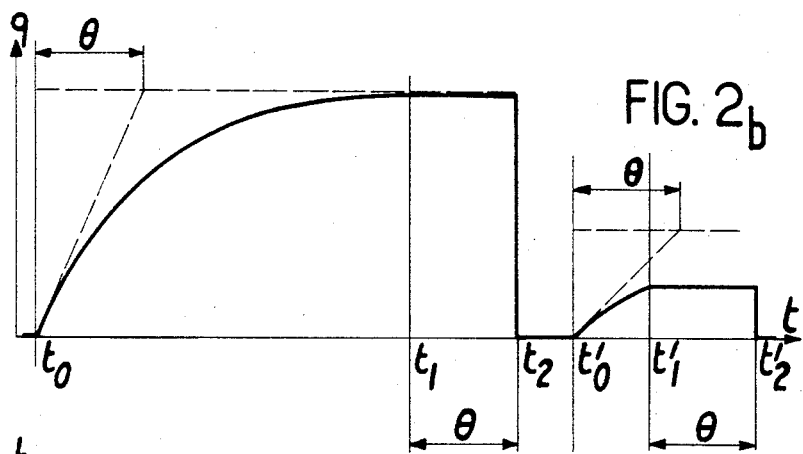
Figure 2C:
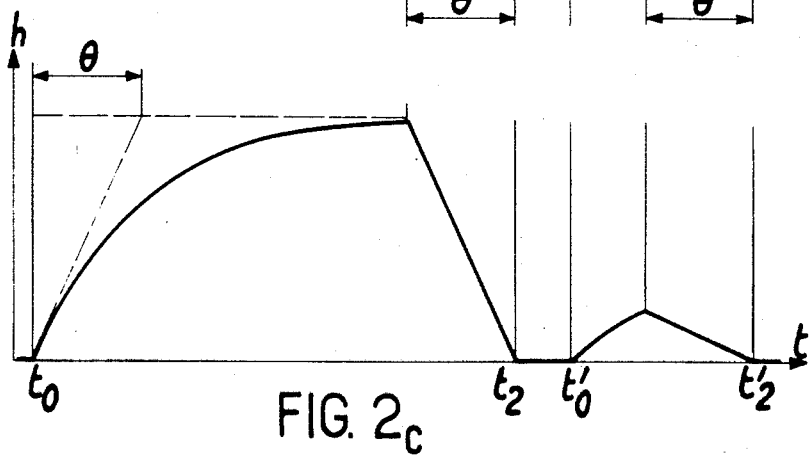

In order that the invention may be clearly understood a preferred embodiment will now be described by way of example with reference to the accompanying drawings in which:

FIGURE 1 is a diagrammatic view of an apparatus according to the invention,

FIGURE 2*a* is a graph showing the rate Q of rainfall;

FIGURE 2*b* is a graph showing the delivery $q$ of the pump of the apparatus; and FIGURE 2*c* is a graph showing the height $h$ of the water in the buffer reservoir in relation to time in a particular instance.

The apparatus shown in FIGURE 1 comprises a collecting element in the form of a rain-gauge 4 having a surface area of, for instance, 1 m.² The rainfall collected in the rain-gauge 4 passes through a pipe 6 into a buffer reservoir 8 connected by an outlet pipe 10 to a $\beta$ radiation-measuring cup 12 disposed in a lead tank 13 for reducing background noise. The cup 12 is connected by a bottom pipe 14 having a flow-regulating element to an enclosure 16 from which the water escapes through a pipe 18.

The flow-regulating element takes the form of a positive displacement hydraulic pump 20 having an electromagnetic drive 22. The pump is controlled by a control circuit 24 to be described hereinafter and fixes the mean delivery rate $q$ in the pipe 14 at a value proportional to the level $h$ of the water in the buffer reservoir, this level being measured by a pressure pick-up 26 connected to the pipe 10 by a branch 28. The use of a hydraulic pump 20 as the flow-controlling element has numerous advantages, e.g. the number of revolutions or reciprocations of the pump enables the volume evacuated to be determined in a simple manner, and the pump closes off pipe 14 completely when inoperative.

The control circuit 24 is formed by an electronic device which receives from the pick-up 26 an input signal whose voltage is proportional to the level $h$. If the electronic device is to be used on a moving installation, such as a ship whose own accelerations are super-imposed on acceleration by gravity, the input signal must be integrated with a time constant adequate to produce a mean value.

In the embodiment illustrated the circuit 24 comprises the pick-up 26, which supplies a direct voltage proportional to the level of the water in the buffer reservoir 8, and a linear amplifier 38 whose output signal acts via a storing element 40 to be described hereinafter on a voltage-frequency converter 42. The continuous signal delivered to the converter 42 at any given moment does not represent the voltage emitted at that moment by the amplifier 38, but the maximum voltage received by the element 40 since its previous resetting: the signal received by the converter therefor represents the peak level of the water in the reservoir 12. The pulses emitted by the converter 42 trigger a monostable multivibrator 44 whose operating time is clearly less than the minimum period of the converter output signals.

The multivibrator 44 triggers a circuit having a thyratron 46 supplying the drive 22 of the pump 24; the thyratron remains energised as long as the monstable multivibrator is operating; the time delay between two successive triggering pulses from the converter should be short enough for the discontinuous operation of the pump to be acceptable. The electromagnetic pump can of course be replaced by a hydraulic pump of some other kind driven by a D.C. motor, in which case the control circuit 24 comprises a tachometer dynamo.

In all cases the mean delivery flow remains proportional to the level of the water in the buffer reservoir 8, and the volume evacuated is measured by recording the time of operation of the pump 20 by means of a counter (not shown).

The element 40 for storing the peak level of the water is not indispensable, but it affords substantial advantages. The storage element 40 prevents the pump from dropping below the rate of operation corresponding to the peak value attained at any time until the buffer reservoir 8 has been emptied; in other words, the storage element keeps the outflow mean rate constant once the maximum rainfall has been attained, and empties the reservoir in a maximum time $\theta$, independently of the level reached, once the rainfall has ended. The maximum emptying time (time $\theta$ on FIG. 2) is never exceeded and is attained only upon a sudden cessation of rainfall.

As soon as the reservoir is empty, a water detector 48 associated with the pick-up 26 transmits via a control line 50, indicated in chain-dot lines in FIG. 1, an order to erase the stored peak value and cuts of the monostable multivibrator 44, possibly with a slight time lag. On the expiry of a maximum time $\theta$ after the rain ends, the pump 20 stops and the apparatus is available to perform a further measurement.

The $\beta$ radiation detecting cup 12 has a proportional counter 30 having a large surface and an anti-coincidence ring. In the embodiment illustrated, the counter 30 is disposed in a dismountable casing above a sheet of Mylar reinforced by a grid which gives the counter 30 mechanical protection when the casing is assembled sealing-tight by the raising of its lower portion. The counter 30 enables a precision in the order of $10^{-6}$ microcuries per cm.$^3$ to be readily achieved.

The apparatus illustrated can also detect $\gamma$ radiation by means of a scintillation assembly 32 disposed in the centre of the enclosure 16 and providing a $\gamma$ ray sensitivity in the order of 1.5 $10^{-6}$ microcuries per cm.$^3$.

The outputs 34, 36 of the radiation-detecting apparatuses are connected to numerical recorders (not shown) which make the necessary corrections, more particularly to allow for the background noise of the $\beta$ radiation counter, and print the results. The control circuit 24 is also connected by a conductor 52 to an instrument recording the volume of water evacuated.

The operation of the apparatus will now be briefly described with reference to FIG. 2, which illustrates two successive rain showers which started and ended suddenly and had a constant rate Q, the rate of rainfall of the second shower being lower than that of the first.

Before the instant $t_0$ corresponding to the beginning of the first shower, the apparatus contains no water and the pump 20 is inoperative. As soon as the first drops falling at the instant $t_0$ reach the buffer reservoir 8 the pressure pick-up actuates the control circuit 24 which controls the pump 20 and the water detector triggers the monostable circuit. The level $h$ in the buffer reservoir rises exponentially, for the apparatus is then the equivalent of an electric circuit comprising a capacitor—i.e., the buffer reservoir—and a leakage resistor—i.e., the flow-regulating element—connected in parallel and supplied with constant intensity—i.e., the rate Q; the level $h$ is then stabilised at a value which is a function of the rate Q, the pump delivery $q$ having reached the same value as Q.

When the shower stops at the instant $t_1$, the element for storing the maximum level reached comes into operation to keep the pump delivery at the value $q$ which it has attained: the buffer reservoir then empties linearly; at the instant $t_2=t_1+\theta$ ($\theta$ being a fixed time) the reservoir is empty, the storage is erased, and the apparatus is then ready for a fresh cycle of operations.

Amongst the advantages of the operation of the apparatus according to the invention, the buffer reservoir is emtpy again and the apparatus is available for further use after a time at most equal to $\theta$ after the rain has ended, the time $\theta$ being independent of the amount of rainfall, as illustrated in FIGS. 2a–2c, which illustrate the operation of the apparatus for the instant $t_0'$ to the instant $t_2'$ during a lighter shower. The start of the shower, which is generally more radioactive than its end, passes slowly in front of the $\beta$ radiation counter, so that sensitivity is improved and the risk of error by missing some of the radioactivity of the rainfall is obviated. In practice, moreover, the fact that the measurement supplied by the apparatus—i.e., the product of the mean activity multiplied by the volume passing through—is assimilated to the total actual radioactivity—i.e., the integral in time of the product of the rate multiplied by the activity—represents only a very small error.

In an embodiment of the apparatus according to the invention actually constructed, the reservoirs 8 and 16 contain 14 litres and 10 litres respectively; the amplifier 38 supplies an output voltage which varies between 0 and 10 v., the latter value corresponding to a volume of 10 litres in the buffer reservoir 8. The element 40 is a digital memory having 64 bits. The storage output voltage, which varies between 0 and 10 v., allows the frequency of the converter 42 to be varied between 0 and 0.1 counts per second. Each count triggers the monostable multivibrator 44 and therefore starts the pump 20 for a stable operational period of 6 seconds.

The apparatus according to the invention enables the $\beta$ and $\gamma$ radioactivities to be checked in rain falling at rates of up to 40 litres per hour per m.$^2$ and collected in a rain-gauge having a surface area of 1 m.$^2$ The apparatus gives the date and amount of rainfall and enables specific total radioactivities in the order of $10^{-6}$ microcuries/cm.$^3$ to be detected.

I claim:

1. Apparatus for determining the radioactivity of rainfall, snow and ice, comprising an atmospheric precipitation collector, an outlet pipe of said collector, a $\beta$-ray detector operatively associated with said pipe, flow regulating means for controlling the rate of flow in said outlet pipe, a sensor for detecting the level of water in said collector, means operatively connected to said sensor and controlling said flow regulating means whereby the mean rate of flow in said pipe has a value substantially in direct proportion to the level of water in said collector and means for measuring the volume of water passing through said outlet pipe.

2. Apparatus for determining the radioactivity of rainfall, snow and ice, comprising an atmospheric precipitation collector, an outlet pipe of said collector, a $\beta$-ray detector operatively associated with said pipe, flow regulating means for controlling the rate of flow in said outlet pipe, a sensor detecting the level of water in said collector, means operatively connected with said sensor and controlling said flow regulating means whereby the mean rate of flow in said outlet pipe has a value substantially in direct proportion to the maximum level achieved at any time in said collector since said collector was last emptied and means for measuring the volume of water passing through said outlet pipe.

3. An apparatus as claimed in claim 2, comprising an element for storing the peak value of the level of the water in the reservoir and means for resetting the storage when the reservoir is empty.

4. An apparatus as claimed in claim 2, in which the outflow control element is a positive displacement hydraulic pump having a counter forming said flow-measuring means.

5. An apparatus as claimed in claim 2 comprising a γ ray-detector disposed in a reservoir supplied by the outlet pipe.

References Cited

UNITED STATES PATENTS 2,998,520   8/1961   Lanford et al.
3,202,819   8/1965   Christianson.

ARCHIE R. BORCHELT, *Primary Examiner.*

U.S. Cl. X.R.

250—43.5, 83.6